United States Patent [19]

Siebecker et al.

[11] Patent Number: 4,902,128
[45] Date of Patent: Feb. 20, 1990

[54] APPARATUS FOR HARMONIZING A PLURALITY OF OPTICAL/OPTRONIC AXIS OF SIGHTING APPARATUS TO A COMMON AXIS

[75] Inventors: Hans Siebecker, Heidelberg; Wolfgang Weigel, Dossenheim, both of Fed. Rep. of Germany

[73] Assignee: Hughes Aircraft Company, Los Angeles, Calif.

[21] Appl. No.: 903,877

[22] Filed: Sep. 3, 1986

Related U.S. Application Data

[63] Continuation of Ser. No. 641,525, Aug. 16, 1984, abandoned.

[30] Foreign Application Priority Data

Aug. 16, 1983 [DE] Fed. Rep. of Germany ....... 3329590

[51] Int. Cl.⁴ .................. G01B 11/26; G01C 3/08; H01L 25/00
[52] U.S. Cl. ................................. 356/152; 356/5; 356/144; 356/145; 250/332; 250/342; 250/347
[58] Field of Search ............... 356/5, 152, 153, 142, 356/144, 145; 89/41.06; 250/332, 330, 347, 342

[56] References Cited

U.S. PATENT DOCUMENTS

| 3,175,458 | 3/1965 | DaCosta | 356/138 |
| 3,480,367 | 11/1969 | Husted et al. | 356/138 |
| 3,582,215 | 6/1971 | Cornillault | 356/152 |
| 3,614,439 | 10/1971 | Beelik, Jr. et al. | 250/332 |
| 3,973,124 | 8/1976 | Astheimer | 250/347 X |
| 4,097,155 | 6/1978 | Appert | 356/152 |
| 4,112,300 | 9/1978 | Hall, Jr. et al. | 89/41.06 X |
| 4,168,429 | 9/1979 | Lough | 356/138 X |
| 4,326,799 | 4/1982 | Keene et al. | 358/152 |
| 4,385,834 | 5/1983 | Maxwell, Jr. | 356/138 X |
| 4,463,258 | 7/1984 | Horne | 250/332 X |
| 4,470,698 | 9/1984 | Green, Jr. et al. | 356/152 |
| 4,542,986 | 9/1985 | Berdanier | 356/5 |

OTHER PUBLICATIONS

Osche et al., "CO₂ Laser-Forward Looking Infrared (FLIR) Integration Concepts," SPIE, vol. 227, 1980, pp. 57-64.

Primary Examiner—Thomas H. Tarcza
Assistant Examiner—Linda J. Wallace
Attorney, Agent, or Firm—W. K. Denson-Low; W. J. Stretter

[57] ABSTRACT

Appartaus is disclosed for harmonizing onto a common reference axis the optical/optronic axes (4;5;18) of an aiming apparatus consisting of day sight channel (3) and combined thermal image/laser reception channel (1) with a stand alone laser transmitter (2). The laser radiation (9) reflected by the target is incident together with the target and ambient inherent radiation (11) via the scanning mirror (12) on selected elements of the detector row array (30), is optoelectronically converted and represented on the light-emitting diode array (25). Via the back of the mirror the signals are imaged on the retina by means of the deflection mirror (23) swung into the ray path. The visible radiatioin (19) imaged in the plane of the day reticle (21) also passes to the observer's eye when the deflection mirror is swung out. The visible radiation (19) in the day sight channel (3) can be observed when the deflection mirror is swung out via an imaging in the plane of the day reticle (21). By observation of the thermal image the day reticle is replaced by the thermal image reticle (29) which is mirrored into the thermal image reproduction channel and superimposed on the thermal image. In the harmonized condition it is shifted onto the position of the day reticle (FIG. 1).

19 Claims, 8 Drawing Sheets

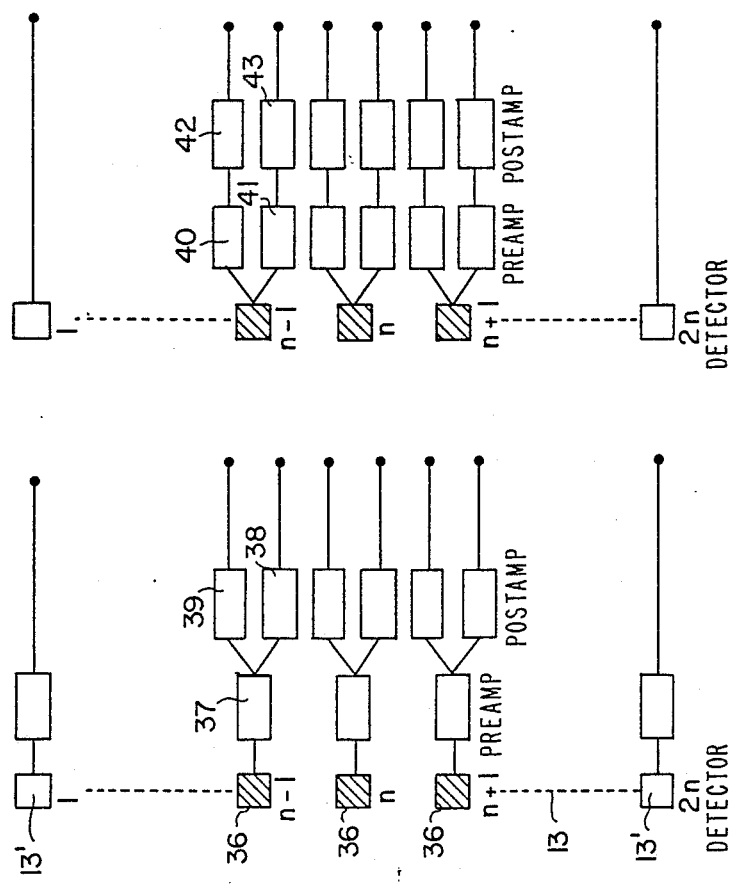

APPARATUS FOR HARMONIZING A PLURALITY OF OPTICAL/OPTRONIC AXIS OF SIGHTING APPARATUS TO A COMMON AXIS

This is a continuation of co-pending application Ser. No. 641,525 filed on August 16, 1984, now abandoned.

RELATED APPLICATIONS

Applicant hereby claims the benefit of the filing date of a prior foreign application (German patent application No. P 33 29 590.5) filed in Germany on August 16, 1983. A certified copy of the above-referenced foreign application has previously been submitted.

BACKGROUND OF THE INVENTION

1. Field of the Invention

The invention relates to methods and apparatus for harmonizing a plurality of optical/optronic axes of an aiming apparatus 2. Description of the Technology DE-PS No. 3,048,809 and DE-OS No. 3,104,318 in the same category disclose methods and apparatus in which a thermal image device is coupled to a laser transmitter in such a manner that the thermal image device is used as reception channel for the laser transmitter. Such a combination has the advantage that expensive and spatially extensive components such as the infrared optical system, detector and cooler for the thermal imaging and the range finding are used jointly and are compatible because of the use of the same spectral range, i.e. subjected to the same atmospheric transmission conditions.

SUMMARY OF THE INVENTION

The invention is based on the following problem: The present invention advantageously provides for harmonizing the optical/optronic axes of a thermal image device, laser range finder and a day sight or, in other words, aligning with each other the day reticle or target mark, thermal image reticle and irradiation direction of the laser transmitter to ensure that the target sighted by the day sight or the thermal image device can be measured by the laser range finder and engaged with high hit probability.

The invention also provides for the possibility of providing harmonizing to give a combination of thermal image device and laser range finder in which a selected (and not a specific) element of the detector row array of the thermal image device is used as laser reception element and a scan position sensor, (SPS) in the scan sensor by sensing the position of the scanning mirror, furnishes the trigger pulse for initiating the laser transmission pulse and additionally, provides for a permanent check of the harmonization quality.

It is assumed that a fixed target mark or reticle is integrated in the day sight and the center point thereof is the passage point of the sight line (reference axis) for the harmonizing and that in the reproduction part of the thermal image device a second movable reticle is generated which can be aligned with the day reticle, for example in a field adjustment; this can be done by aiming exactly at a remote target with the day sight and switching to the thermal image whilst retaining the alignment and with the aid of adjustment wedges in the afocal beam path of the thermal image reproduction channel the thermal image reticle is aligned exactly with the target represented as a thermal image. The day sight channel and the thermal image device are then harmonized with each other via the reticles.

Since the day sight and thermal image device are separate components and are mounted on a common support which acts as optical bench with the movable thermal image reticle a tolerance must be expected which in the most unfavorable case in the azimuth and elevation corresponds to ±25% of the image field angle. It must be possible to move the thermal image reticule with the aid of the adjustment wedge pair through this tolerance angle to ensure after completion of the adjustment operation an adjustment accuracy within a tolerance of ±0.1 mrad.

It is further presumed that the sight arrangement is such that the laser transmitter is rigidly coupled to the day sight and the irradiation axis of the laser transmitter beam remains adjusted to better than ±0.1 mrad on the day sight line. Since the laser pulse with a pulse duration of about 50 ns requires amplifier bandwidths of at least 10 MHz but the amplifier bandwidths for the reception of the thermal image signals lie at a maximum of 100 KHz, the sensor elements used for the laser radiation must be equipped with preamplifiers which can receive short laser pulses and simultaneously process low-frequency thermal image information. This can be achieved according to the invention for example in that an element or a few elements in the center region of the detector row array for receiving the laser radiation are equipped with a wide-band preamplifier with very low bottom limit frequency and after the preamplification via a frequency-dividng network low-frequency thermal image signals and high-frequency laser pulses can be separately post-amplified and further processed. Because of the high technical expenditure it is advantageous to equip only one to three center elements with wide-band preamplifiers, frequency-dividing networks and separate post-amplifiers. It is also possible to provide adjustment facilities which permit axis harmonizing beyond the tolerance range present of about ±7 mrad in azimuth and elevation, these adjustment methods being used for the thermal image pickup channel. In order to bring the day reticle and thermal image reticle into coincidence, after the harmonizing of the day and thermal image reception channels the thermal image reticle is set in the thermal image reproduction channel to the target image. This is conveniently also done by a rotating wedge pair. As a result of these features the day reticle and the thermal image reticle are coincident at the point of intersection of the sight lines and the harmonizing condition can be checked by day/night switching-over. With exactly identical magnifications and edge distortions of day image and thermal image a coincident superposition of day image and thermal image is obtained in the eyepiece if instead of the day/thermal image device mirror changeover the changeover is accomplished instead with a partially transparent and partially reflecting beam splitter.

To enable a check of the harmonizing of the axes to be carried out when necessary, for example immediately before engaging the target, according to a further development of the invention in a test mode the light-emitting diode associated with the laser reception element is stimulated to emit light with an electrical signal so that in the thermal image reproduction channel a bright horizontal line is produced which runs across the center of the sighted target when the laser reception channel and thermal image reticle are harmonized in elevation. To check the harmonizing in azimuth the same light-emitting diode is stimulated to emit light by the sensing pulse of the SPS periodically in the image recurrence frequency, said pulse normally triggering the laser transmission pulse. With exact azimuth harmonizing the light spot lights up on the point of the target aimed at. In the case of maladjustment the harmonizing according to this further development of the invention can take place in two steps, the vertical adjustment being by the rotary wedge in the parallel beam path between the IR telescope and scanner with permanent illumination of the selected light-emitting diode and the horizontal adjustment being via a change in the delay time between the zero position of the SPS and periodic transmission of the gating pulse for driving the light-emitting diode, the delay time corresponding substantially to twice the travel time of the target range to be measured twice. The adjustment can however also be with the pulsed light-emitting diode if the vertical deviation is again corrected by rotating the correction wedge in the thermal image pickup channel and the horizontal correction then made by changing the delay time.

BRIEF DESCRIPTION OF THE DRAWINGS

Below, with the aid of basic drawings embodiments of the invention will be explained in detail, corresponding parts in the individual Figures having the same reference numerals. In the drawings:

FIG. 2 is a schematic illustration of a detector row array of 2n individual elements in which for example the center elements of the row n-1, n and n+1 are provided with a common wide-band preamplifier for amplifying the received laser signals and the thermal image signal and in each case two separate post-amplifiers with different bandwidths for separating the laser signal from the thermal image signal (a), and a modified version with separation of the signals directly at the detector output and separate preamplifiers and post-amplifiers (b).

DESCRIPTION OF A PREFERRED EMBODIMENT

Figure 1A:
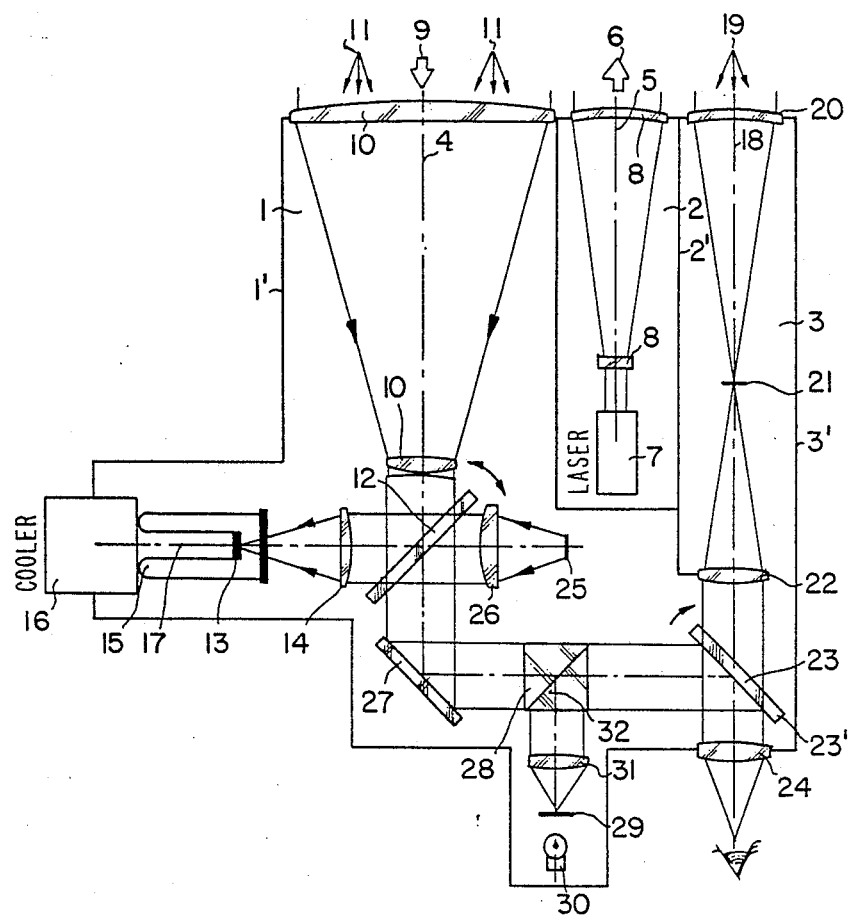
FIG. 1 is a schematic illustration of a sighting system, consisting of a day sight channel, a thermal image reception channel, the laser reception channel of a laser range finder with an offset laser transmitter, a reticle and optical means for harmonizing the sighting system (a); a perspective illustration of the same system without image reproduction of the thermal image channel and without day sight (b).

FIG. 1a shows an optronic aiming apparatus with the thermal image laser reception channel 1 in the housing 1', the laser transmitter 2 in the housing 2' and the optical day sight channel 3 in the housing 3'.

Figure 1B:
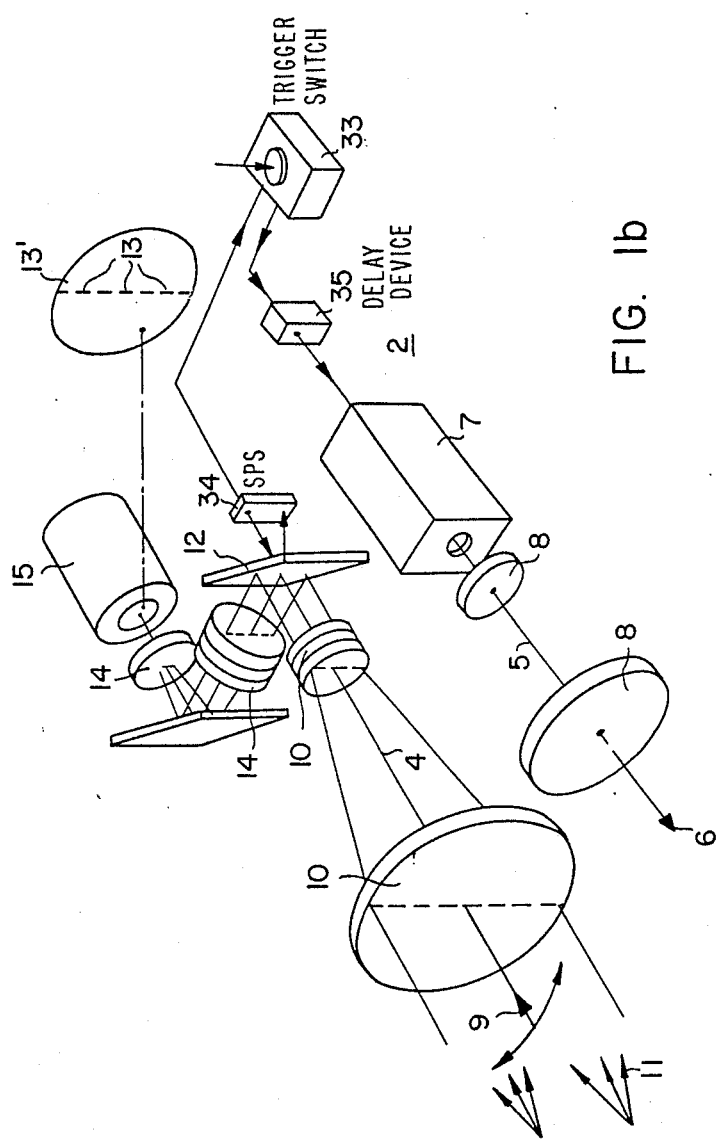

The combined thermal image laser reception channel 1 is coupled to the laser transmitter 2 in such a manner that the optical axis 4 of the reception channel and the optical axis 5 of the laser transmitter are practically parallel, i.e. with deviations less than 0.1 mrad. The laser radiation 6 is generated in the resonator 7, formed to a sharp beam by the transmission optical system constructed as Galilean telescopic and emitted in the direction of the arrow. The laser radiation reflected from the target, not illustrated, passes in the direction of the arrow 9 through the IR telescope 10 constructed as reception optical system, when good harmonizing exists between the transmitter and reception unit, travelling parallel to the optical axis 4 of the reception channel 1. Also entering through the same entrance pupil of the IR telescope 10 are the target and environment inherent radiation 11, the radiation 11 being depicted by the arrows also having the reference number 11 which illustrate the image field angle processed. Both radiations, of which the laser radiation is a line radiation and the thermal radiation from the target and background a wide-band radiation of for example 8-12 μm, leave the telescope as parallel beams, are incident on the scanning mirror 12 mirrored on both sides and focused onto the sensor 13 which is disposed in the image plane of the IR objective 14, surrounded by the Dewar vessel 15 and cooled by the cooler 16 whose cooling finger 17 brings the sensors to low temperatures. The back of the scanning mirror 12 is used to reproduce the optoelectronically transformed thermal image. The scanning mirror 12 is necessary for the thermal image pickup channel whose sensor 13 has a row array of up to 200 individual detectors which according to FIG. 1b are disposed perpendicularly to the scanning direction and are usually spaced one detector width apart from each other. It is thereby possible by means of a line interlacing method to write 2n lines with n sensor elements. Each individual detector 13' sees at every instant depending upon the position a different part of the scene represented in the image plane, this process being repeated with the period of the harmonic oscillation of the mirror. The incident laser radiation 9 differs from the passive thermal radiation 11 in that it is incident with exact harmonizing of the sighting system parallel to the optical axis 4 of the reception channel as signal pulse with a pulse duration of about 50 ns and thus contains frequency components in the MHz range whilst thermal radiation is incident in the entire image angle range of the thermal image device defined by the scanning angle of the scanning mirror 12 and includes frequency components of a few Hz to about 100 KHz. This is known in the art.

The day sight channel 3 is connected via its housing 3' to the remaining sighting system in such a manner that the optical axis 18, which at the same time is the line of sight, extends in the harmonized condition parallel to the other optical axes 4 and 5. The visible radiation from the scene, indicated by three arrows also having the reference numeral 19, is imaged by the objective 20 in the reticle plane 21, collimated by the collimator lens 22 and with the extended deflection mirror 23 (not shown) observed via the eyepiece 24. For observation and target engagement with the thermal image device the light-emitting diode row array 25 is imaged via the objective 26, the back of the scanning mirror 12, the fixed deflection mirror 27, the beam splitter prism 28, the deflection mirror 23 moved at 45° into the optical ray path of the day sight channel about the fulcrum 23' in the direction of the arrow and the eyepiece 24 on the retina of the observer. The day reticle 21 is replaced by the thermal image reticle 29 of the reticle projector 29 to 31, the reticle being illuminated by the lamp 30 and mirrored via the collimator optical system 31 and the partially reflecting beam splitter layer 32 of the beam splitter prism 28 into the thermal image reproduction channel and superimposed on the thermal image. In the harmonized condition, when in a manner not illustrated optical axes of day sight channel and thermal image device are parallel, the adjustable thermal image reticle 29 is displaced until it appears when the deflection mirror 23 is pivoted in the day sight channel. It is assumed that the optical axes 5 and 18 respectively of the laser transmitter 2 and day sight channel 3 run exactly parallel.

FIG. 1b shows components of the sighting arrangement according to FIG. 1a in perspective, except for the day sight channel 3, in order to describe the production of the trigger pulse for the laser transmitting pulse. Compared with FIG. 1a it contains the additional components range-meter trigger switch 33, scan position sensor (abbreviated to SPS) 34 and variable delay device 35. After operation of the actuating switch 33 by the gunner with the aid of the SPS 34 the position of the scanning mirror 12 is determined for which the thermal image receiver assumes a definite position with respect to the optical axis 5 of the laser transmitter 2 and initiates a trigger pulse for the laser transmitting pulse via the variably adjustable delay device 35 which the laser transmitter then transmits via the transmission telescope 8. The delay time can be set so that the portion of the laser pulse 9 reflected by the target enters the thermal image reception channel via the telescope 10 at an instant at which the scanning mirror 12 assumes a position such that the laser pulse is focused via the IR objective 14 onto the element (e.g. element n) of the detector row array 13 prepared for the processing of the extremely short pulse.

FIG. 2a shows as example the detector row array 13 with 2n individual detectors 13' which are disposed in a vertical row and spaced apart the distance of one detector width. In the example 3 of the center detectors 36 are connected to wide-band preamplifiers 37 with bandwidths of several MHz. They amplify the laser and thermal image signals; their outputs are connected in parallel to the inputs of two post-amplifiers 38 and 39, of which the one post-amplifier 38 has an upper limit frequency of about 100 kHz and amplifies the thermal image signal whilst the second post-amplifier 39 with a lower limit frequency of about 100 kHz and an upper limit frequency of a few MHz has the nature of a band-pass filter and amplifies and passes on the laser signals.

The illustration of FIG. 2b differs from that of FIG. 2a in that the laser signal and thermal image signal are processed by separate preamplifiers 40 and 41 with low-pass and band-pass characteristics and further amplified in separate post-amplifiers 42 and 43.

In the schematic illustrations of FIG. 3a to 3d four different means are shown with which the optical axis 4 of the thermal image reception channel 1 by separate adjustment operations in the azimuth and elevation directions is adjusted with respect to the laser transmitter 2 (FIG. 1) and day sight channel 3 in such a manner that the laser radiation 9 reflected by the target impinges on the prepared center detector n 36 of the detector row array 13 and the laser pulse is supplied via preamplifier 37 (FIG. 2a) and post-amplifier 39 to the evaluation electronics. This "dynamic" harmonizing is achieved in that a scan position sensor 43' connected rigidly to the housing of the scanning mirror 12 projects rays from the punctiform light source 44 via the 1—1 beam splitter mirror 45 and the optical system 46 onto one of the two mirror surfaces, in the example the reproduction-side mirror surface, of the scanning mirror 12 and the reflected rays pass via the same optical system 46 and the partially transparent beam splitter mirror 45 through the pin or slit diaphragm 47 and produce in the detector 48 a trigger signal if by the angular position of the scanning mirror 12 momentarily autocollimation is established. This trigger pulse is used to trigger the laser pulse. By selecting the delay via the variable delay device 35 (FIG. 1b) the laser radiation 9 reflected by the target can be made to be incident through the IR telescope 10 when the scanning mirror 12 is so aligned that the laser radiation is incident on the detector row array 13, i.e. horizontal harmonizing is achieved. The vertical harmonizing which ensures that the incident laser radiation impinges on the selected nth detector 36 is effected in FIG. 3a via the rotary wedge 49 which is disposed about the rotation axis 50 perpendicular to the optical axis 4 and the scanning mirror rotation axis 51.

Figure 3A:
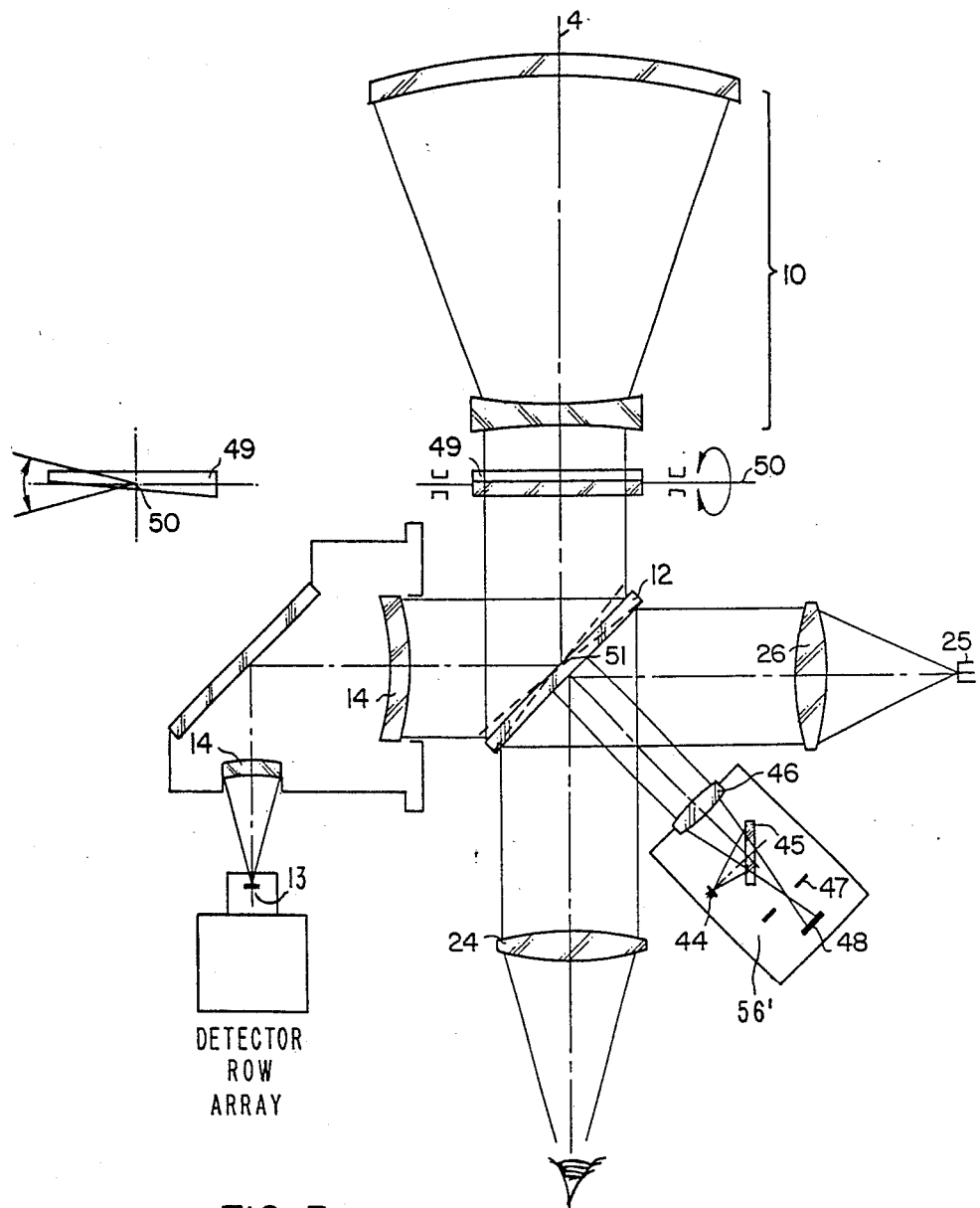
FIG. 3 is a schematic illustration with amplifiers and detector row arrays modified according to FIG. 2a or FIG. 2b in which as harmonizing means for the adjustment in the vertical direction an acromatic wedge pivotal about an axis is used which is disposed in the afocal beam path behind the telescope of the thermal image device (a), or in the convergent beam path of the IR objective (b). Also used is a rotatable deflection mirror of the IR objective, which forms a right-angle, said mirror being rotatable about an axis inclined at 45° to the mirror surface (c) or in another version the last lens group of the IR telescope which is moved perpendicularly to the optical axis of the telescope and to the axis of rotation of the scanning mirror (d,d'). After the harmonizing in all 4 cases a to d the adjustment members are arrested in the adjustment position.
Figure 3B:
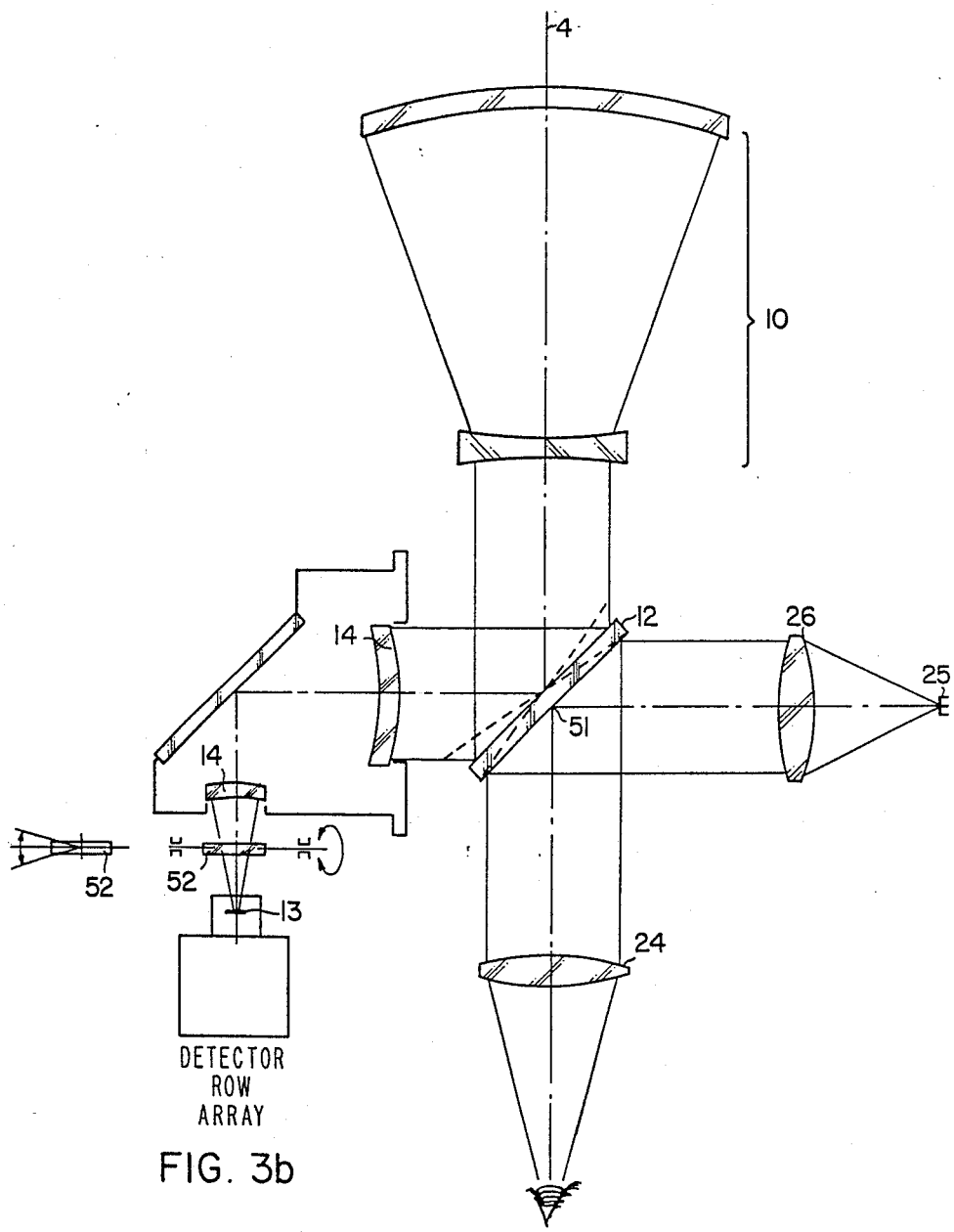

In FIG. 3b for vertical harmonizing a plane plate 52 is disposed rotatably in the convergent beam path of the IR objective 14.

Figure 3C:
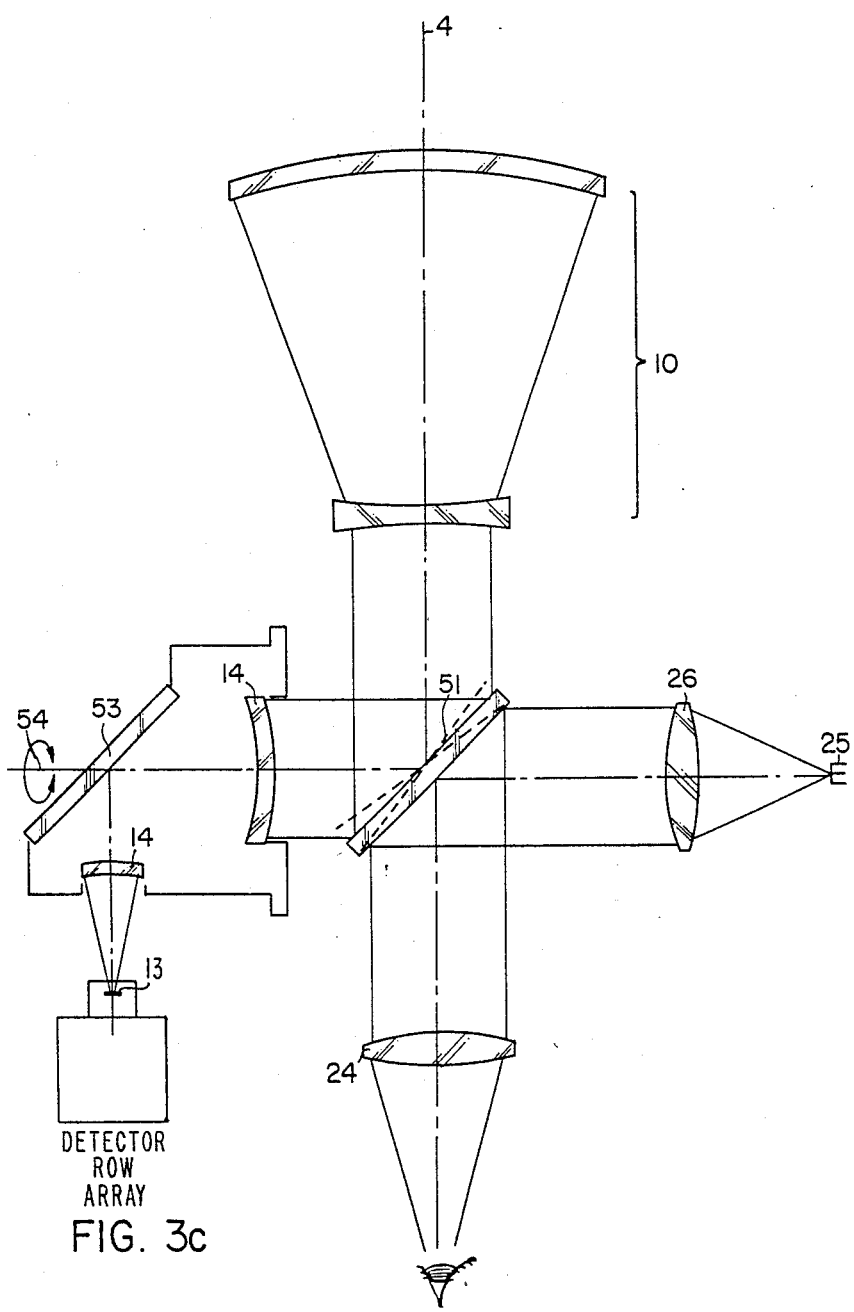

In FIG. 3c the deflection mirror 53 of the IR objective 14 is rotated about the axis 54 for the harmonizing.

Figure 3D:
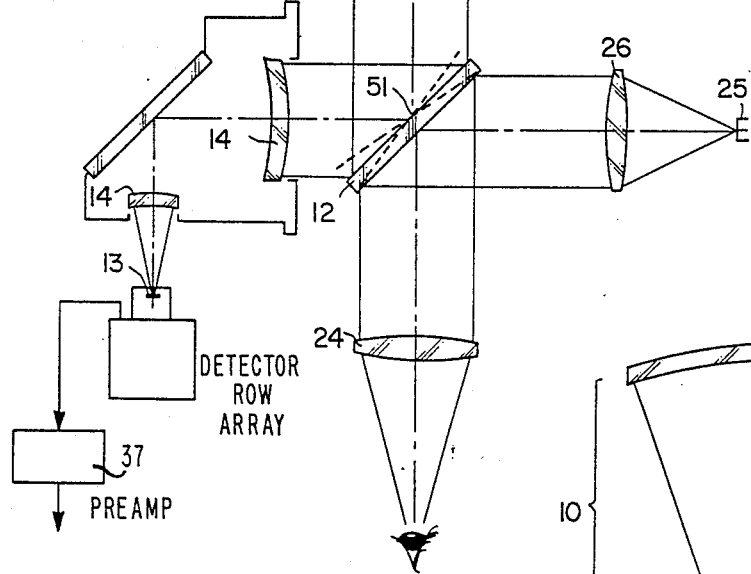
Figure 3D:
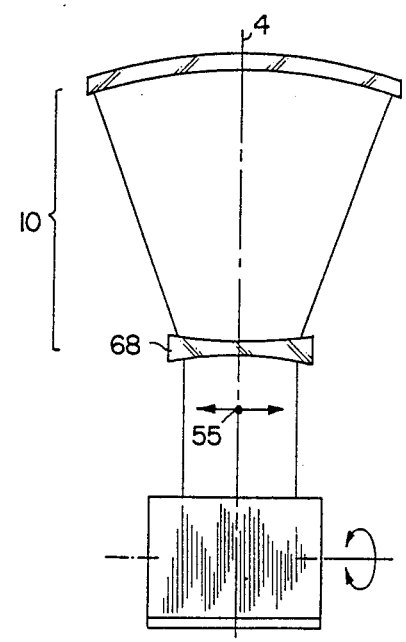

According to FIG. 3d the rear member 68 of the IR telescope 10 is moved in the direction of the arrow 55 parallel to the rotation axis 51 of the scanning mirror.

In all the four last cases described the horizontal harmonizing is in the manner explained regarding the example of embodiment according to FIG. 3a.

Figure 4:
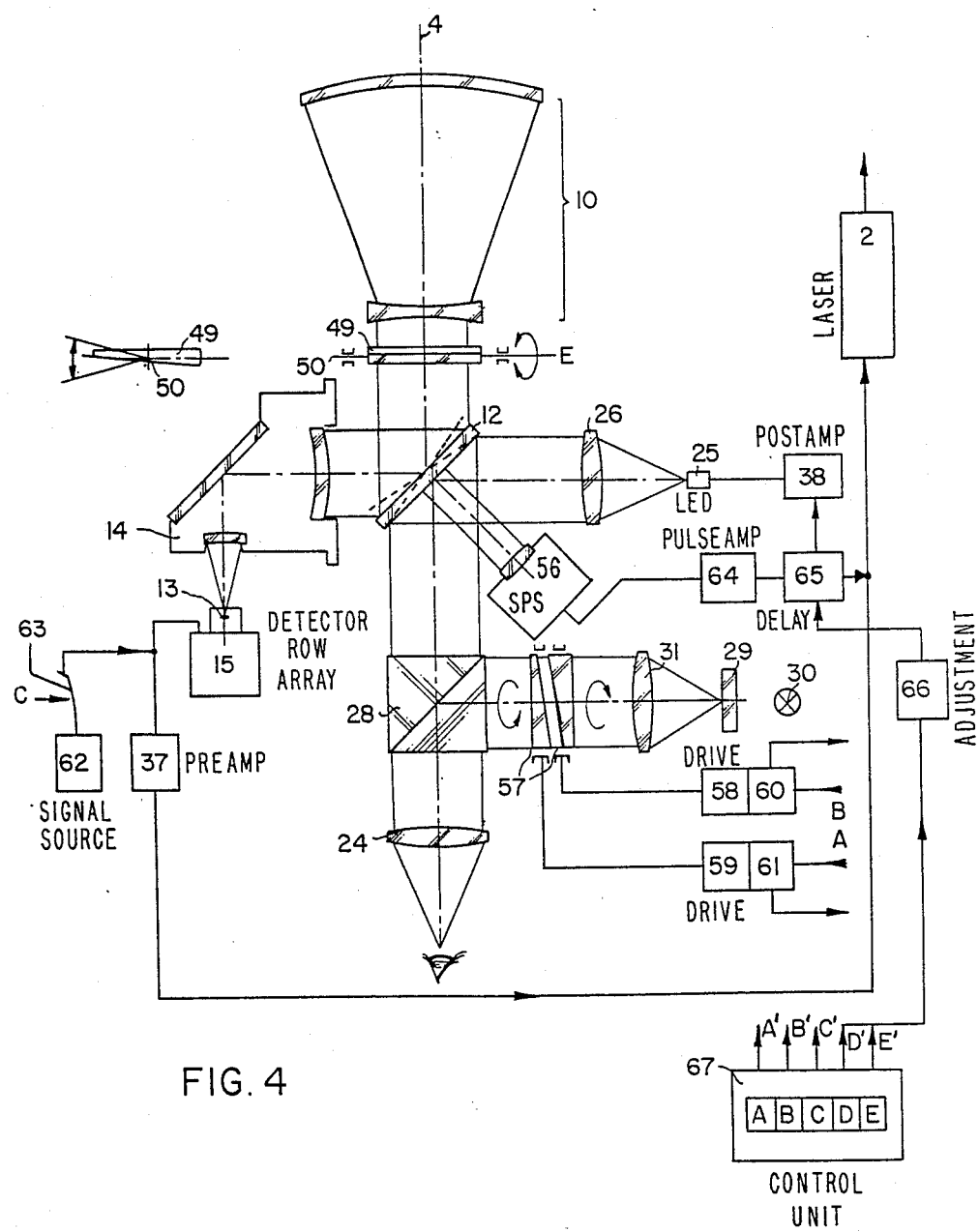
FIG. 4 shows with the aid of the example of FIG. 3a in simplified form the reflecting of the thermal image reticle into the optical beam path of the thermal image reproduction channel and the adjustment facility of the thermal image reticle with respect to the day reticle, not illustrated, by suitable rotation of the rotary wedge pair in front of the optical system of the reticle projector.

FIG. 4 illustrates with reference to the example of embodiment according to FIG. 3a the harmonizing of the thermal image reception channel to the day sight channel 3 and laser transmitter 2 and the alignment of the thermal image reticle 29 of the thermal image reproduction channel 12 and 23 to 28 with the day sight line.

In the sighting apparatus illustrated in FIG. 1a the harmonizing between the various channels is effected in that a definite target point at adequate range is sighted with the day sight channel and in the center of the day reticle with the mirror 23 swung out and by swinging the mirror 23 over the eyepiece 24 the thermal image of the same scene is observed. With the aid of adjusting means, for example rotary wedges disposed between the beam splitter prism 28 and the reticle projector 29 to 31, the thermal image reticle 29 is then aligned so that the point target appears in the center of the thermal image reticle 29. The thermal image reproduction channel 12 and 23 to 28 is then harmonized with the day channel 3 and the laser transmitter 2. It is however not yet ensured that the selected detector element n 36 of the detector row array 13 receives the laser radiation reflected by the target. For this purpose, in accordance with FIG. 4 the following harmonizing procedure is to be adopted:

The thermal image reticle 29 is harmonized via the rotary wedge pair 57 with the point target represented in the thermal image; each rotary wedge is driven by a separate drive 58, 59 and its position can be determined by integrated angle pickups 60, 61. When the point target is imaged in the reticle center point the preamplifier 37 (or 40) of the nth detector element is subjected by the signal generator 62 via the switch 63 to a continuous-wave video signal which via the post-amplifier 38 drives the nth element of the light-emitting diode row array 25 and thus causes the nth line of the thermal image to emit light. By rotating the adjustment wedge 49 provided between the IR telescope 10 and the scanning mirror 12 about the axis 50 thereof the thermal image is displaced perpendicularly to the scanning direction so that the nth line coincides with the target point. Then, by actuating the switch 63 the signal source 62 is disconnected and by the SPS 43 an extremely short pulse periodically generated with the scanning frequency of the scanning mirror 12 when the latter is in autocollimation. This pulse is amplified in the pulse amplifier 64 and supplied via the controllable delay circuit 65 to the post-amplifier 38 which periodically briefly activates the nth element of the light-emitting diode row array 25 and thus with constant delay causes a definite point of the nth line to light up. The same signal is also used for triggering the laser transmitter 2. With the aid of the adjustment means 66 the delay time of the delay circuit 65 is set so that the nth element of the light-emitting diode row array lights up exactly whenever the nth detector 13' is exactly aligned with the point target. The thermal image reception channel is then harmonized as laser reception channel with the day sight channel 3 and laser transmitter 2 and at the same time the day reticle 21 and thermal image reticle 29 are coincident.

The same harmonizing procedure can be used when instead of the adjustment wedge 49 (FIG. 3a) the plane plate 52 (FIG. 3b), the rotatable deflection mirror 53 (FIG. 3c) or the displaceablerear member 68 of the telescope 10 (FIG. 3d) is used for the vertical harmonizing.

FIG. 4 further shows schematically the integrated control unit 67 for the harmonizing having the control elements A to E and the corresponding outputs A' to E' for carrying out the various harmonizing steps described in the preceding text.

With the control elements A and B the adjusting wedges 57 are separately adjusted, C switches the signal source 62 on and off, D controls via the adjusting means 66 the variable delay device 65 and E serves for the vertical harmonizing by rotation of the rotary wedge 49 about its axis 50.

Although the present invention has been described in detail with reference to a particular preferred embodiment, persons having ordinary skill in the art will appreciate that various modifications and alterations may be made without departing from the spirit and scope of the invention.

What is claimed is:

1. An aiming apparatus, said aiming apparatus comprising:
    a laser transmitter having a first optical axis;
    a thermal imaging device having a second optical axis; said first and said second optical axes being substantially parallel one to the other, said imaging device further comprising an IR radiation telescope, a scanning mirror disposed within said second optical axis, and an IR sensor row array having a preceding IR objective, said row array comprising a plurality of linearly disposed detectors operable for detecting IR radiation reflecting from said mirror, said apparatus being operable for displacing a thermal radiation image of a scene including a target by means of a thermal image reproduction channel upon an image plane of an eyepiece for aligning said second optical axis upon said target, said sensor row array being disposed relative to said mirror for receiving portions of said scene radiation reflecting from said mirror and passing through said IR objective continuously and consecutively, said sensor row array further being disposed to receive reflected laser pulses emitted by said laser transmitter when said mirror is in a predetermined angular position relative to said array, said apparatus further comprising:
    a day sight channel having a third optical axis substantially parallel to said first and said second optical axes, said day sight channel comprising a day reticle perpendicularly disposed to said third optical axis and parallel to said image plane;
    a sensor operable for sensing said laser pulses and said thermal image, said sensor being operatively coupled to a selected one or ones of said detectors for sensing the IR radiation detected therein; and
    an integral thermal image reticle operable for being imaged upon said image plane for aligning said row array with said first optical axis, said thermal image reticle further being alignable with said day reticle whereby said second and said third optical axis are harmonized one with the other by temporarily superimposing said day reticle and said thermal image reticle one upon the other with an adjusting means.

2. An aiming apparatus according to claim 1 wherein said sensor is operably coupled to a selected one or ones of said detectors, said selected detector being disposed at a center of said array.

3. An aiming apparatus according to claim 1 wherein a shared reticle is utilized within said thermal imaging device and said day sight channel.

4. An aiming apparatus according to claim 1 wherein a trigger pulse operable for triggering said laser transmitter to emit a pulse is further operable to drive said selected one or ones of said detectors.

5. An aiming apparatus according to claim 1 wherein said thermal image reproduction channel is comprised of a surface of said scanning mirror, a deflection mirror and a prism.

6. An aiming apparatus according to claim 5 wherein said adjusting means comprises a vertical harmonizing means and a horizontal harmonizing means, said horizontal harmonizing means comprising:
    a continuous-wave video signal generator switchably coupled to said selected one or ones of said detectors for driving said detectors;
    a light emitting diode array comprised of a plurality of LED elements corresponding in a one to one fashion with said plurality of detectors, each of said LED elements being operable for generating light when a corresponding detector is driven, each of said LED elements further being capable of being imaged upon said image plane;
    a scan position sensor operably coupled to said scanning mirror for sensing the angular position thereof, said sensor having an electrical pulse output operable for illuminating a selected one of said LED elements on autocollination of said scanning mirror; and a variable pulse delay circuit operably coupled to said pulse output whereby said thermal image reception channel is aligned horizontally by varying the delay of said pulse delay circuit to cause said selected LED element to be illuminated when the corresponding detector element is aligned with said target.

7. An aiming apparatus according to claim 6 wherein said vertical harmonizing means comprises a rotary wedge having a rotational axis disposed perpendicularly to said second optical axis whereby said reflected laser radiation is caused to impinge on said selected detector by an angular displacement of said rotary wedge.

8. An aiming apparatus according to claim 6 wherein said vertical harmonizing means comprises a plane plate rotatably disposed within said IR objective whereby said reflected laser radiation is caused to impinge on said selected detector by an angular displacement of said plane plate.

9. An aiming apparatus according to claim 6 wherein said vertical harmonizing means comprises an IR objective deflection mirror having a rotational axis, whereby said reflected laser radiation is caused to impinge on said selected detector by an angular displacement of said deflection mirror.

10. An aiming apparatus according to claim 6 wherein said vertical harmonizing means comprises a rear member of said IR radiation telescope, said rear member adapted for movement in a plane parallel to a rotational axis of said scanning mirror whereby said reflected laser radiation is caused to impinge on said selected detector by a movement of said rear member.

11. An aiming apparatus according to claim 1 wherein said sensor is comprised of a wide-bandwidth preamplifier operable for amplifying said laser pulses and also said thermal image.

12. An aiming apparatus according to claim 1 wherein said laser transmitter, said thermal imaging device, and said day sight channel are each mounted to a shared support.

13. An aiming apparatus according to claim 1 further comprising:

a day channel deflection mirror, said day channel deflection mirror being pivotally mounted along said third optical axis for imaging said LED elements upon said image plane.

14. An aiming apparatus according to claim 11 wherein said wide-bandwidth preamplifier has an output coupled to a high frequency post amplifier operable for amplifying said laser pulse and, wherein said preamplifier output is further coupled to a low frequency post amplifier operable for amplifying said scene radiation.

15. An aiming apparatus according to claim 1 wherein said sensor comprises a high frequency preamplifier having an output operatively coupled to a high frequency postamplifier operable for amplifying said laser pulse and, wherein said sensor further comprises a low frequency preamplifier having an output operatively coupled to a low frequency preamplifier operable for amplifying said scene radiation.

16. A method of harmonizing one to another a polarity of substantially parallel optical/optronic axes of an aiming apparatus, the apparatus comprising a laser tramsmitter having a first optical axis, a thermal imaging device having a second optical axis, the device comprising a scanning mirror disposed along said second optical axis for reflecting incident thermal scene and reflected laser radiation upon a detector row array, the row array comprising a plurality of individual detectors each having a sensor operably coupled thereto for sensing detected radiation, at least one of the detectors having a sensor adapted for sensing both the thermal scene and reflected laser radiation, the device further comprising a LED row array comprising a plurality of LED's each one of which being operatively coupled to a corresponding one of said detectors for being illuminated when the corresponding detector is stimulated, the device further comprising an integral thermal reticle, the apparatus further comprising a day sight channel having a third optical axis, a pivotally mounted mirror disposed along the third optical axis and a day reticle disposed perpendicularly to the third optical axis, the day sight channel operable for sighting a target such that the day sight reticle is alignable on a desired point on the target, comprising the steps of:

sighting a target such that the day sight reticle is aligned on the desired point;

pivoting the pivotally mounted mirror such that a thermal image of the target is sighted, the thermal image being reflected from the thermal image device via the pivotally mounted mirror;

adjusting an adjusting means for aligning the thermal reticle on the desired point;

stimulating the adapted sensor with a continuous-wave video signal thereby causing the corresponding LED to be continuously illuminated;

displacing the thermal image, including the image of the target, such that the illumination of the corresponding illuminated LED is caused to coincide with the desired point;

switching off the continuous wave video signal thereby causing the corresponding LED to be extinguished; and controllably pulsing the laser transmitter thereby causing the adapted sensor to be stimulated in a pulsed manner due to the selected detector detecting the laser radiation, whereby the resulting pulsed illumination from the corresponding LED is aligned on the desired point and whereby the first, second and third axes are aligned one to another.

17. The method of claim 16 wherein the adjusting means is a pair of rotary wedges.

18. The method of claim 16 wherein the step of controllably pulsing is accomplished by varying a pulse delay circuit being operable for delaying a pulse generated by an autocollination of the scanning mirror, the delayed pulse being operable for pulsing the laser transmitter and, additionally, for illuminating the corresponding LED.

19. The method of claim 16 wherein said steps of harmonizing are accomplished before a use of the apparatus to verify the harmonizing of the apparatus.

* * * * *

UNITED STATES PATENT AND TRADEMARK OFFICE
CERTIFICATE OF CORRECTION

PATENT NO. : 4,902,128

DATED : February 20, 1990

INVENTOR(S) : Hans Siebecker and Wolfgang Weigel

It is certified that error appears in the above-identified patent and that said Letters Patent is hereby corrected as shown below:

Column 10, lines 3 and 4, Claim 16, delete "polarity" insert --plurality--.

Signed and Sealed this

Eighteenth Day of February, 1992

Attest:

HARRY F. MANBECK, JR.

*Attesting Officer*      *Commissioner of Patents and Trademarks*